(12) United States Patent
Wang et al.

(10) Patent No.: US 7,004,794 B2
(45) Date of Patent: Feb. 28, 2006

(54) LOW-PROFILE USB CONNECTOR WITHOUT METAL CASE

(75) Inventors: Kuang-Yu Wang, Saratoga, CA (US); Jim Ni, San Jose, CA (US); Ren-Kang Chiou, Fremont, CA (US); Edward W. Lee, Mountain View, CA (US); Tzu-Yih Chu, San Jose, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

(21) Appl. No.: 10/917,672

(22) Filed: Aug. 13, 2004

(65) Prior Publication Data

US 2005/0085133 A1     Apr. 21, 2005

Related U.S. Application Data

(63) Continuation-in-part of application No. 10/605,146, filed on Sep. 11, 2003, now Pat. No. 6,854,984.

(51) Int. Cl.
    *H01R 33/00* (2006.01)

(52) U.S. Cl. ...................................... 439/660

(58) Field of Classification Search ................ 439/660, 439/680, 377, 55, 76.1; 713/200–202, 185; 361/752, 785, 791, 736; 235/492
See application file for complete search history.

(56) References Cited

U.S. PATENT DOCUMENTS

| | | | |
|---|---|---|---|
| 5,725,395 A | 3/1998 | Lee et al. | |
| 5,941,733 A | 8/1999 | Lai et al. | |
| 6,027,375 A | 2/2000 | Wu et al. | |
| 6,165,016 A | 12/2000 | Lai | |
| 6,309,255 B1 * | 10/2001 | Yu | 439/660 |
| 6,334,793 B1 | 1/2002 | Amoni et al. | |
| 6,385,677 B1 | 5/2002 | Yao | |
| 6,439,464 B1 | 8/2002 | Fruhauf et al. | |
| 6,533,612 B1 | 3/2003 | Lee et al. | |
| 6,561,421 B1 | 5/2003 | Yu | |
| 6,567,273 B1 | 5/2003 | Liu et al. | |
| 6,618,243 B1 | 9/2003 | Tirosh | |
| 6,671,808 B1 * | 12/2003 | Abbott et al. | 713/200 |
| 6,744,634 B1 * | 6/2004 | Yen | 361/752 |
| 6,778,401 B1 * | 8/2004 | Yu et al. | 361/752 |
| 2003/0094490 A1 | 5/2003 | Lee | |
| 2003/0100203 A1 | 5/2003 | Yen | |
| 2003/0104835 A1 | 6/2003 | Douhet | |
| 2003/0145141 A1 | 7/2003 | Chen et al. | |

* cited by examiner

Primary Examiner—Alexander Gilman
(74) Attorney, Agent, or Firm—Bever, Hoffman & Harms, LLP; Patrick T. Bever

(57) ABSTRACT

A low-profile Universal-Serial-Bus (USB) connector includes a substantially flat base structure that is received in the lower section of a conventional female USB connector, and includes metal contacts formed on an upper surface of the base structure. Wobble or vertical play is reduced by rails extending along side edges of the base structure that are partially inserted into gaps formed between the metal case and base structure of the female USB connector. Between metal contacts on the low-profile USB connector are raised ribs (dividers) that prevent undesirable damage or contamination to the metal contacts. The connector base structure of the low-profile USB connector can be separate or can be integrated with a circuit board that holds a flash memory chip and a USB controller chip.

13 Claims, 9 Drawing Sheets

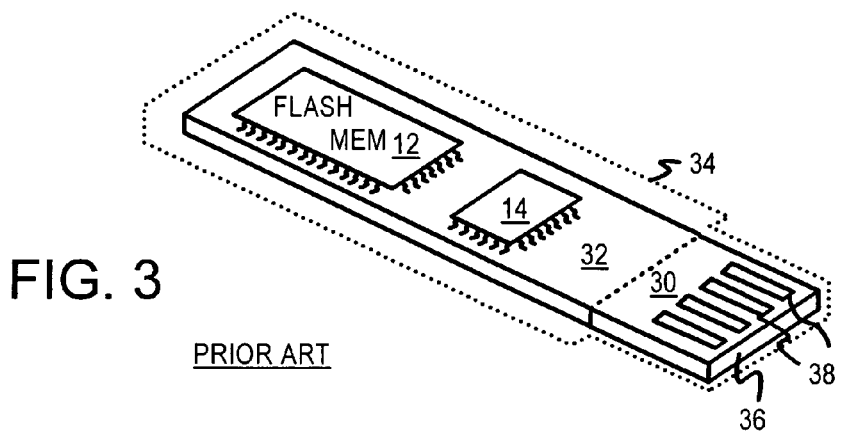
FIG. 3
PRIOR ART
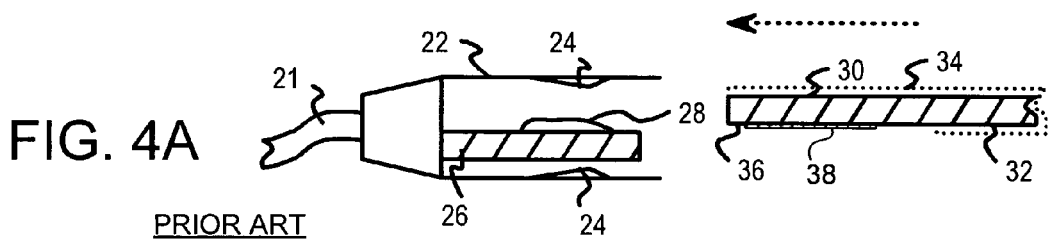
FIG. 4A
PRIOR ART
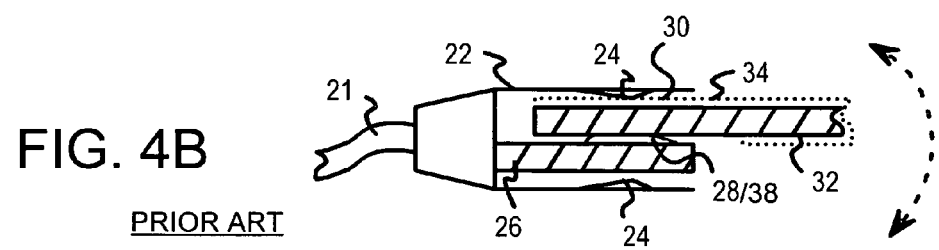
FIG. 4B
PRIOR ART
FIG. 5
PRIOR ART

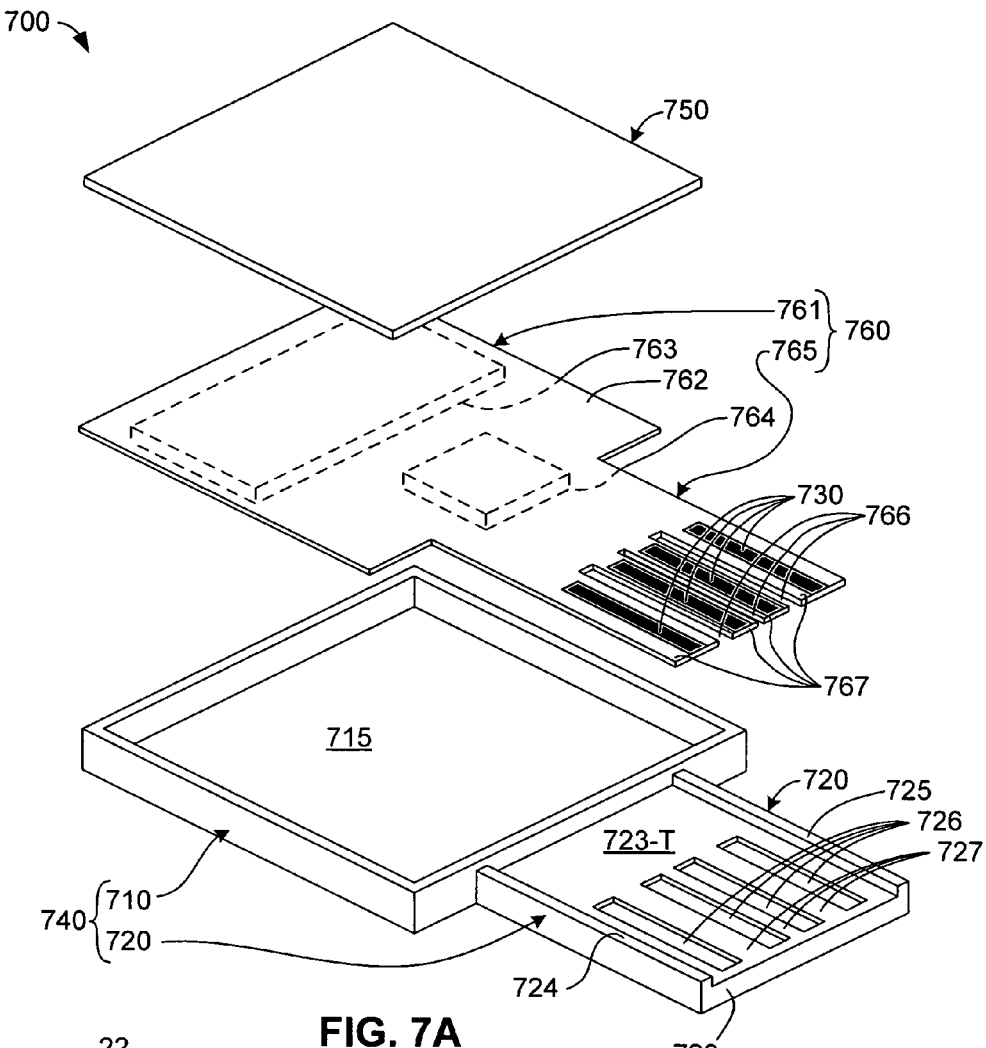
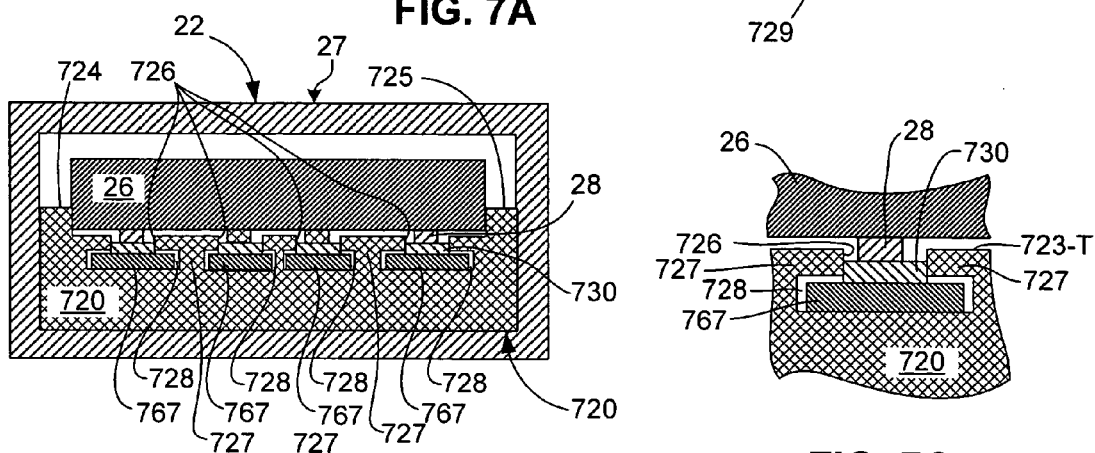
FIG. 7A
FIG. 7B
FIG. 7C

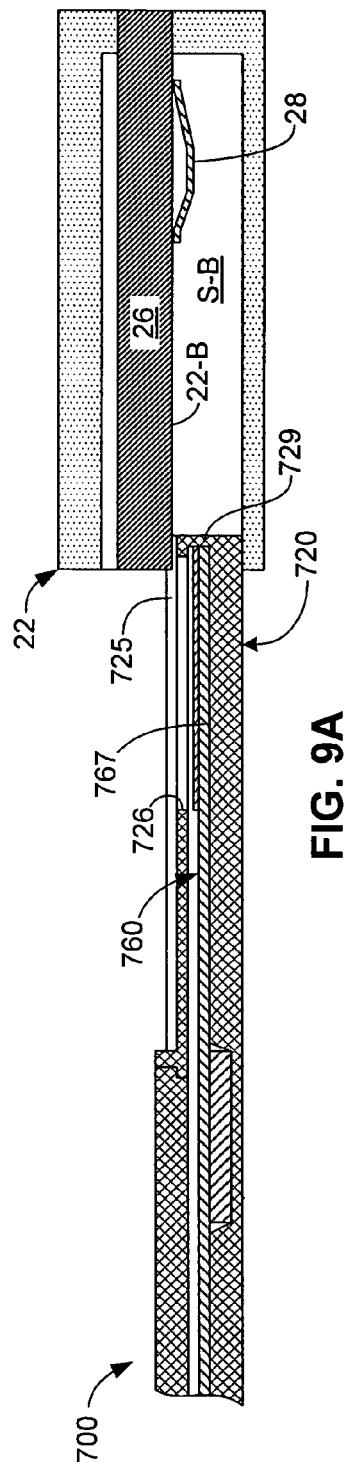
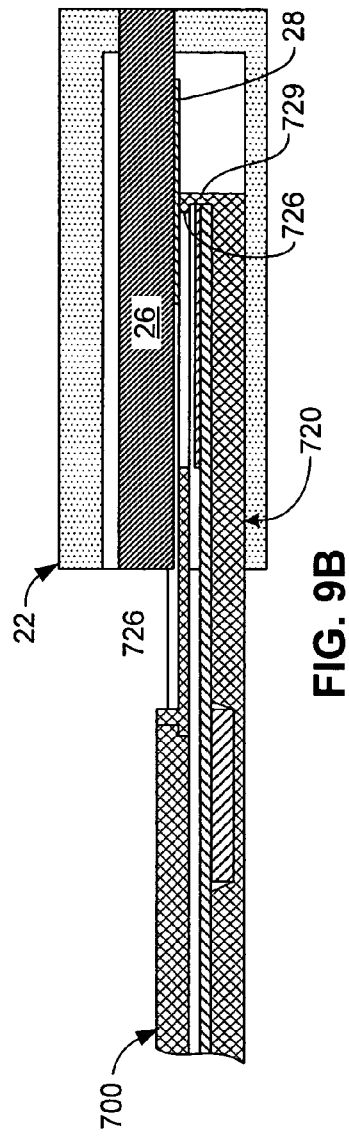
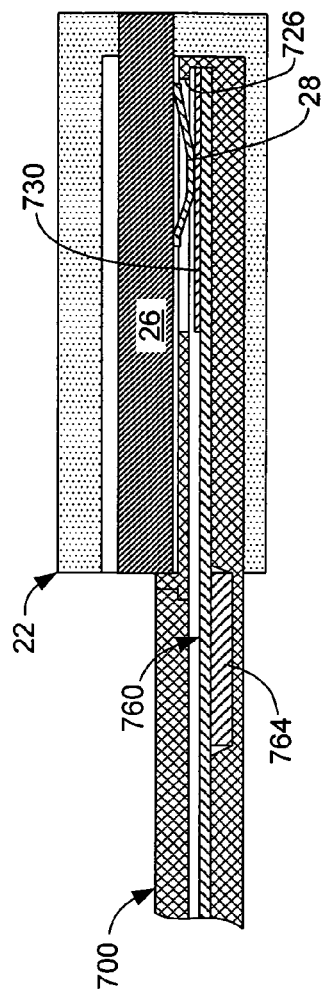

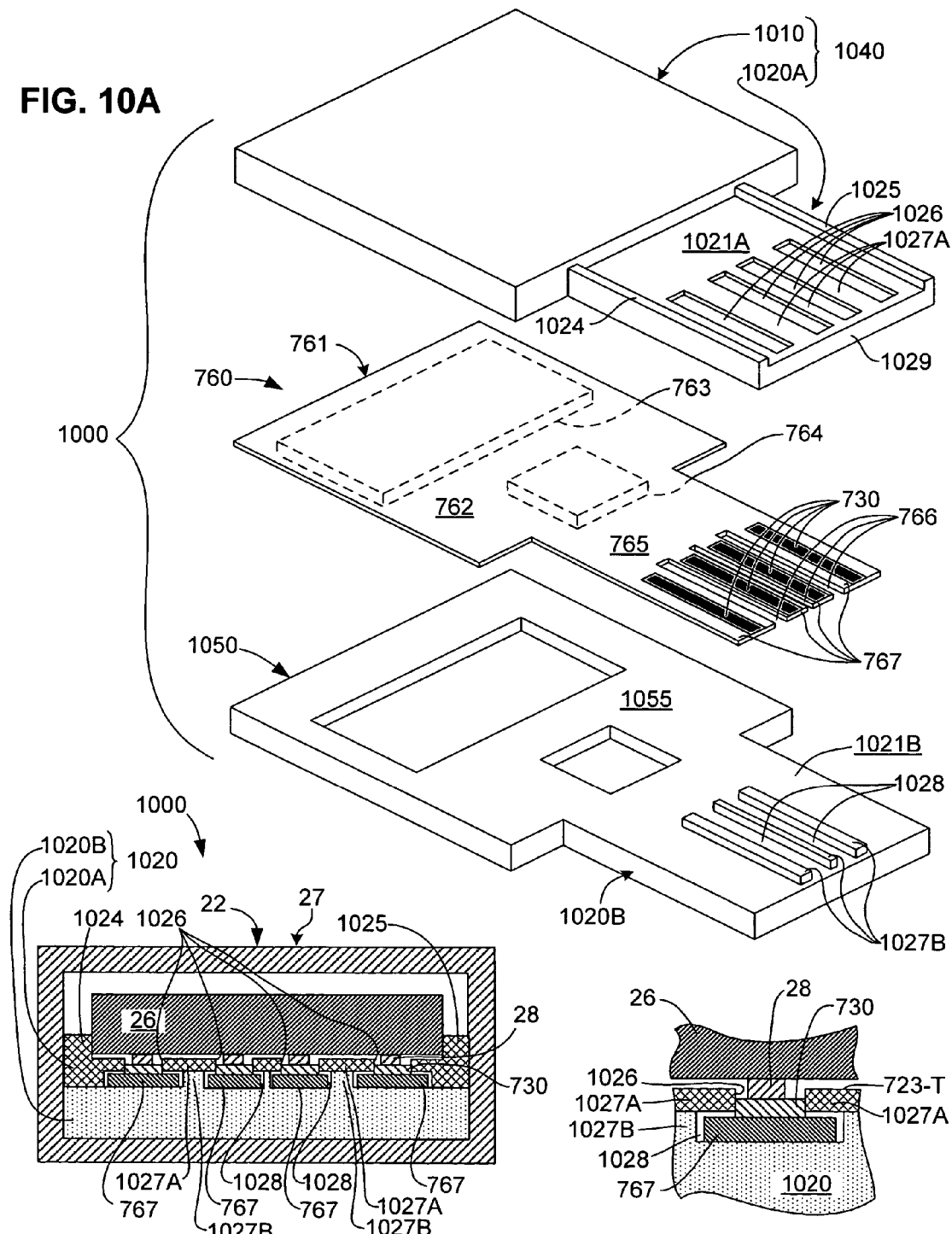

LOW-PROFILE USB CONNECTOR WITHOUT METAL CASE

CROSS-REFERENCE TO RELATED APPLICATIONS

The present application is a continuation-in-part of co-owned U.S. application Ser. No. 10/605,146, filed Sep. 11, 2003, now U.S. Pat. No. 6,854,984 entitled "Slim USB Connector with Spring-Engaging Depressions, Stabilizing Dividers and Wider End Rails for Flash-Memory Drive", which is incorporated herein by reference in its entirety.

FIELD OF THE INVENTION

This invention relates to electronic connectors, and more particularly to low-profile (reduced-height) Universal-Serial-Bus (USB) connectors.

BACKGROUND OF THE INVENTION

Rapid advances in technology in several areas have converged to enable small, portable memory cards with vast capacities. Flash memory technologies such as those using electrically-erasable programmable read-only memory (EEPROM) have produced chips storing 128 M-Bytes or more. Small flash-memory cards have been designed that have a connector that can plug into a specialized reader, such as for compact-flash, secure-digital, memory stick, or other standardized formats.

More recently, flash memory cards are being sold that contain a USB connector. Such USB-flash memory cards do not require a specialized reader but can be plugged into a USB connector on a personal computer (PC). These USB-flash memory cards can be used in place of floppy disks. A USB-flash card can have a capacity of more than ten floppy disks in an area not much larger than a large postage stamp.

FIG. 1A shows a prior-art flash-memory card with an industry-standard USB connector. Flash memory chip 12 may be a 128 Mega-byte non-volatile chip or may have some other capacity. Controller chip 14 contains a flash-memory controller that generates signals to access memory locations within flash memory chip 12. Controller chip 14 also contains a USB interface controller that serially transfers data to and from flash memory chip 12 over a USB connection.

USB connector 20 may be mounted on board 10, which is a small circuit board with chips 12, 14 mounted thereon. Multi-layer printed-circuit board (PCB) technology can be used for board 10. A plastic case (not shown) can surround board 10. USB connector 20 is a male connector, such as a type-A USB connector, as it is locked to a female connector (to be discussed later) to transmit data between the flash memory card and a host. The term "male" may be dropped throughout the text to describe the male connector or any components thereon, in situations when there is no ambiguity.

USB connector 20 contains a small connector substrate 16, which is often white ceramic, black rigid plastic, or another sturdy substrate. Connector substrate 16 has four or more metal contacts 18 formed thereon. Metal contacts 18 carry the USB signals generated or received by controller chip 14. USB signals include power, ground, and serial differential data D+, D−.

USB connector 20 contains a metal case 17 that wraps around connector substrate 16. The metal case touches connector substrate 16 on three of the sides of connector substrate 16. The top side of connector substrate 16, holding metal contacts 18, has a large gap to the top of the metal case. On the top and bottom of this metal wrap are formed holes 15.

FIG. 1B shows a female USB connector. Female USB connector 22 can be an integral part of a PC, or can be connected by cable 21. Another female connector substrate 26 contains four metal contact 28 that make electrical contact with the four metal contacts 18 of the male USB connector 20 of FIG. 1A. Female connector substrate 26 is wrapped by a female metal case 27, but small gaps exist between the female metal case 27 and connector substrate 26 on the lower three sides to allow the upper three sides of the male metal case 17 to be inserted.

Locking is provided by metal springs 24 in the top and bottom of the metal case 27. When male USB connector 20 of FIG. 1A is flipped over and inserted into female USB connector 22 of FIG. 1B, metal springs 24 lock into holes 15 of USB male connector 20.

FIG. 2A and FIG. 2B are longitudinal cross-sections highlighting connections between male and USB female connectors. Female USB connector 22 is on the left while male USB connector 20 is being inserted from the right. Male USB connector 20 is flipped over relative to the view of FIG. 1A. Metal contacts 18 are formed on the lower surface of connector substrate 16 on male USB connector 20, while metal contacts 28 are formed on the upper surface of connector substrate 26 on female USB connector 22. The female metal contacts 28 generally are made with flexible metal springs which are placed parallel to the longitudinal direction of the female substrate 26, with their central portion protruded upward into the traveling path of the male USB connector 20. The protruded portion of the metal contact springs 28 will be depressed and deflected downward as the male USB connector is inserted to the female USB connector. Thus the metal contacts face one another to allow for electrical contact when male USB connector 20 is inserted into female USB connector 22 as shown in FIG. 2B.

FIG. 2C is a transverse cross-section illustrating the coupling between male and female USB connectors. This cross-section is perpendicular to the cross-sections shown in FIG. 2A and FIG. 2B. The male USB connector is represented by metal case 17, substrate 16 and four metal contacts 18. The female USB connector is represented by metal case 27, substrate 26 and four metal contacts 28. The external dimensions of the male metal case 17 matches the internal dimensions of the female metal case 27, and the two form an interference fit when fully engaged allowing male metal contacts 18 to be firmly in touch with the female metal contacts 28 to establish electrical connection.

Metal springs 24 formed on the metal case surrounding connector substrate 26 on female USB connector 22 fit into holes on the metal case of male USB connector 20. This helps to lock the connectors together.

FIG. 3 shows a prior-art USB flash memory card using a slim (low-profile) USB connector (based on U.S. Published application No. 2003/0100203 A1). Male USB connector 20 of FIGS. 1, 2 is relatively large. The metal case in particular is cumbersome and increases manufacturing cost. Costs may be reduced by integrating male USB connector 30 with board 32. Board 32 is a PCB that has flash memory chip 12 and controller chip 14 mounted thereon. Board 32 is extended to include male USB connector 30, which has metal contacts 38 formed on end 36 of board 32. The metal case shown in an industry-standard USB male connector does not exist. The edges are raised by a set of juts to prevent the male USB connect from wrongfully engaging to the female USB connector.

The width and thickness of board 32 at end 36 containing male USB connector 30 is designed to approximately match that of connector substrate 16 of FIG. 1A. Plastic case 34 can enclose board 32 but have an opening for metal contacts 38. Plastic case 34 can cover the bottom and sides of male USB connector 30 up to end 36 to emulate potions of the metal case of the male USB connector of FIG. 1A.

FIG. 4A and FIG. 4B show longitudinal cross-sections of the prior-art male slim USB connector being inserted into a standard female USB connector. Board 32 that has male USB connector 30 formed on end 36 is flipped over from the view shown in FIG. 3, and end 36 is inserted into female USB connector 22 from the right side.

Metal contacts 38 are located on the lower surface of male USB connector 30. Plastic case 34 has an opening on the lower surface of male USB connector 30 to expose the metal contacts so they can make electrical connection with metal contacts 28 on the upper surface of connector substrate 26 of female USB connector 22 when inserted as shown in FIG. 4B. The male metal contacts 18 are in touch with the female metal contacts 28 in the full engagement position to establish electrical contact. However, as the male metal case has been removed from the male USB connector, the four metal contacts 18 will be exposed when the male USB connector is disengaged with the female USB connector. As there is no protection for metal contacts, it is likely that these metal contacts can accidentally be touched by human fingers, resulting in contamination and even damage due to electrostatic charges. While slim USB connector 30 can be less expensive and smaller than the standard USB connector, it fits less securely into a standard female USB connector. The lack of the metal case removes the mechanical support provided as the male metal case that fit in the gap below connector substrate 26 and the bottom side of the metal case for the female connector. Also, plastic case 34 does not lock into metal springs 24 on the top of female USB connector 22. The result is a noticeable wobble in the up and down direction when a USB flash memory card containing male USB connector 30 is inserted into female USB connector 22. Vertical movement of 3–4 millimeter at the end of a 4-centimeter flash card can occur with slight finger pressure. This vertical play gives the user the feeling that the flash memory card is cheap and unreliable, even when sufficient electrical contact is made.

What is desired is a low-profile male USB connector with reduced vertical wobble which also provides needed protection to the metal contacts in the USB connector. A low-profile male USB connector that more securely fits into a standard female USB connector is desired. A low-profile male USB connector with a more secure fit is desired that can be integrated with the circuit board containing the flash memory chip is also desirable.

SUMMARY OF THE INVENTION

The present invention is directed to a low-profile male USB connector that eliminates the upper portion of rectangular metal case of conventional male USB connectors, and instead includes a base structure that is received in the lower opening of a conventional (standard) female USB connector. The metal contacts of the male USB connector are formed on an upper surface of the base structure such that they abut the contact springs of the female USB connector when the male USB connector is fully inserted therein. By eliminating the upper portion of the metal case associated with conventional male USB connectors, the present invention substantially reduces the connector's profile (i.e., vertical height), thereby facilitating the production of smaller, flatter USB apparatus.

According to an aspect of the present invention, the metal contacts formed on the upper surface of the relatively planar (flat) base structure are recessed (i.e., such that a plane defined by an upper surface of the metal contacts is between the uppermost surface and lowermost surface of the base structure. A potential problem associated with removing the metal casing used in conventional male USB connectors is that the metal contacts may be exposed to touching by users, thereby contaminating and/or damaging the metal contacts. By recessing the metal contacts into the base structure, the male USB connector of the preset invention avoids this undesirable contact (i.e., ribs disposed between adjacent metal contacts prevent a user's finger from touching the recessed metal contacts).

According to another aspect of the present invention, the male USB connector includes a pair of side rails that extend upward from side edges of the base structure, thereby forming a substantially U-shaped cross-section. When inserted into a standard female USB connector, the base structure occupies the lowermost open regions of the female USB connector, and the side rails extend upward into lower portions of open regions defined between the substrate and metal case of the female USB connector. This arrangement prevents wobbling of male USB connector relative to the female USB connector when inserted therein, thereby allowing the male USB connector to maintain a secure connection to the female USB connector.

According to various specific embodiments, the metal contacts of the male USB connector can take the form of metal pads built on top of a printed circuit board (PCB), and connect to electrical circuits mounted on the PCB through traces. In these embodiments, the PCB may be mounted into a pocket formed in the base structure such that the metal contacts are exposed through openings defined in an upper wall of the base structure. Alternatively, the metal contacts can take the form of metal strips built directly on the top surface of a plastic or ceramic base structure, and be connected electrically and physically to corresponding metal tabs (not shown) as they exit from the rear of the male USB connector. The base structure may then be mounted onto a PCB, with the metal tabs soldered to electrical contacts provided on the PCB.

BRIEF DESCRIPTION OF THE DRAWINGS

FIG. 3 shows a prior-art USB flash memory card using a slim USB connector.

FIGS. 4A and 4B are longitudinal cross-sections of the prior-art slim USB connector being inserted into a conventional female USB connector.

FIG. 5 is a transverse cross-section of a conventional female USB connector.

FIGS. 7A, 7B and 7C are exploded perspective, cross-sectional end, and enlarged cross-sectional end views, respectively, showing a USB flash memory card including a low-profile male USB connector according to a first specific embodiment of the present invention.

FIGS. 9A, 9B, and 9C are cross-sectional end views showing the USB flash memory card during insertion into a standard female USB connector.

FIGS. 10A, 10B, and 10C are exploded perspective, cross-sectional end, and enlarged cross-sectional end views showing a USB flash memory card including a low-profile male USB connector according to a second specific embodiment of the present invention.

DETAILED DESCRIPTION

The present invention relates to an improvement in low-profile USB connectors. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

For the sake of brevity and clarity, the following description and appended claims utilize the terms "upper" and "lower" to indicate the relative positions of opposing surfaces or other features. These terms are not intended to necessarily limit the associated surfaces/features to a particular fixed up/down orientation.

Figure 1A:
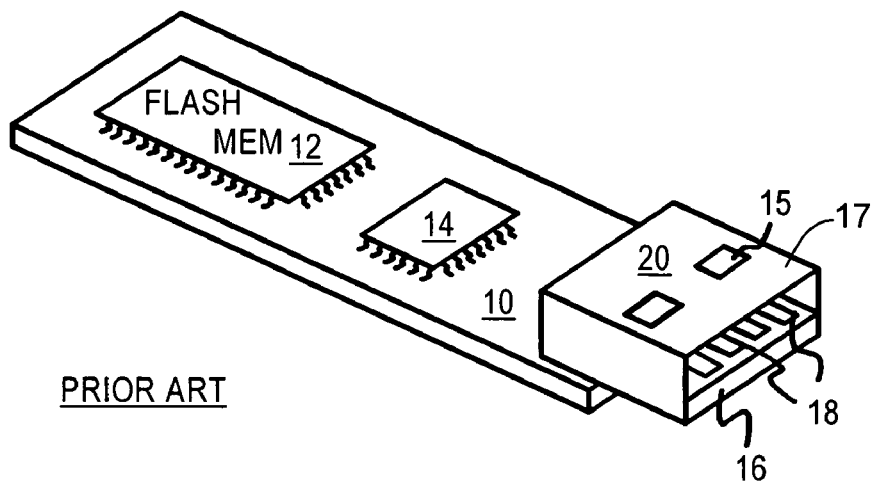
FIG. 1A shows a prior-art flash-memory card with a USB connector.
Figure 1B:
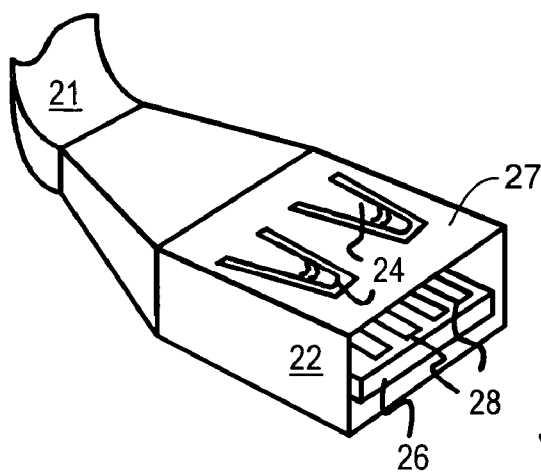
FIG. 1B shows a female USB connector.
Figure 2A:
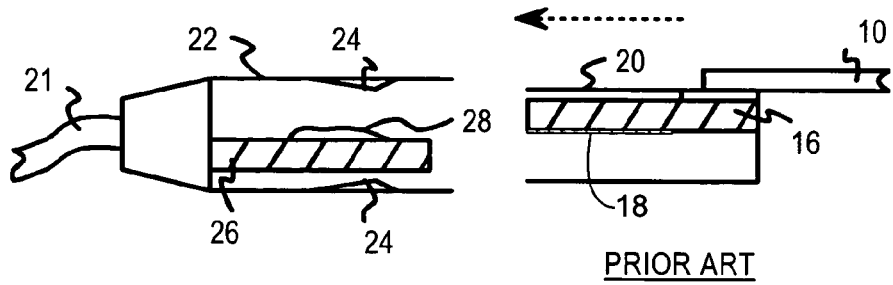
FIGS. 2A and 2B are longitudinal cross-sections highlighting connections between male and female USB connectors.
Figure 2B:
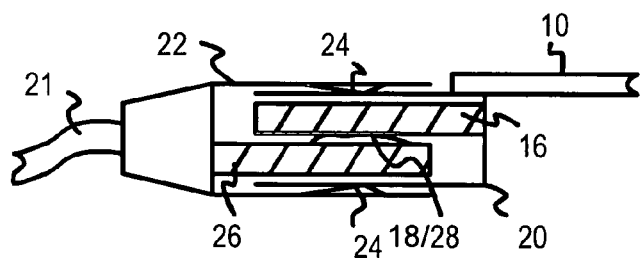
Figure 2C:
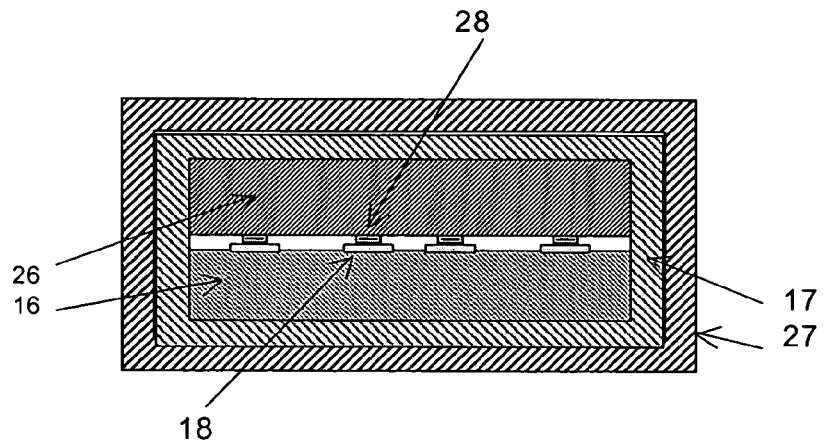
FIG. 2C is a transverse cross-sections highlighting connections between male and female USB connectors.

FIG. 5 is a cross-sectional end view showing a conventional female USB connector 22 including a metal case 27 surrounding a connector substrate 26 having four metal spring contacts 28 mounted thereon in the manner described above, which are positioned to firm contact with male metal contacts (not shown) of a male USB connector when a USB flash memory card (or other USB device) is inserted to the female USB connector, and the male USB connector and female USB connector are fully engaged. Metal case 27 includes an upper wall 27-T, a first side wall 27-S1, a second side wall 27-S2, and a bottom wall 27-B that define a rectangular opening having an inside height H and an inside width W. Connector substrate 26 is a substantially flat member disposed inside the rectangular opening defined by metal case 27 such that the surfaces of connector substrate 26 are separated from inside surfaces of metal case 27 by associated open regions. For example, a first open region S-B of the rectangular space is defined between a lower surface 26-B (on which spring contacts 28 are mounted) and bottom wall 27-B of the metal case 27. Similarly, a first side edge 26-S1 of connector substrate 26 is separated from first side wall 27-S1 of metal case 27 by a (second) open region S-LT, a second side edge 26-S2 of connector substrate 26 is separated from second side wall 27-S2 of metal case 27 by a (third) open region S-RT, and a top surface 26-T of connector substrate 26 is separated from top wall 27-T of metal case 27 by a (fourth) open region S-T. A lower left open region S-LB is located below open region S-LT, and a lower right open region S-RB is located below open region S-RT. Two metal springs 24-T located inside the upper wall 27-T of metal case, and another two metal springs 24-B located inside the bottom wall 27-B lock to the holes 15 of the male connector 20 (FIG. 1A). The un-deflected height of the metal spring is approximately 0.5 mm. Note that a height Hi between lower surface 26-B and bottom wall 27-B of the metal case 27 is approximately 2.6 mm, which is slightly larger than the combined thickness of 2.4 mm for a substrate 16 and a metal case 17 of a conventional male USB connector as shown in FIG. 2C, to allow for space occupied by the deflected metal springs 24-B. Note also that values of Hi may vary among manufacturers as the amount of deflection from the metal springs 24-B may vary.

As discussed above, conventional male USB connectors include metal cases that occupy all spaces designated as S-T, S-LT, S-RT, S-LB, S-RB and S-B (i.e., substantially the entire inner rectangular space defined by metal case 27). Hence, the total height of a standard male USB connector, at 4.5 mm, is equal to or slightly smaller than the inside height H of the metal case 27 of the female USB connector 22.

Figure 6A:
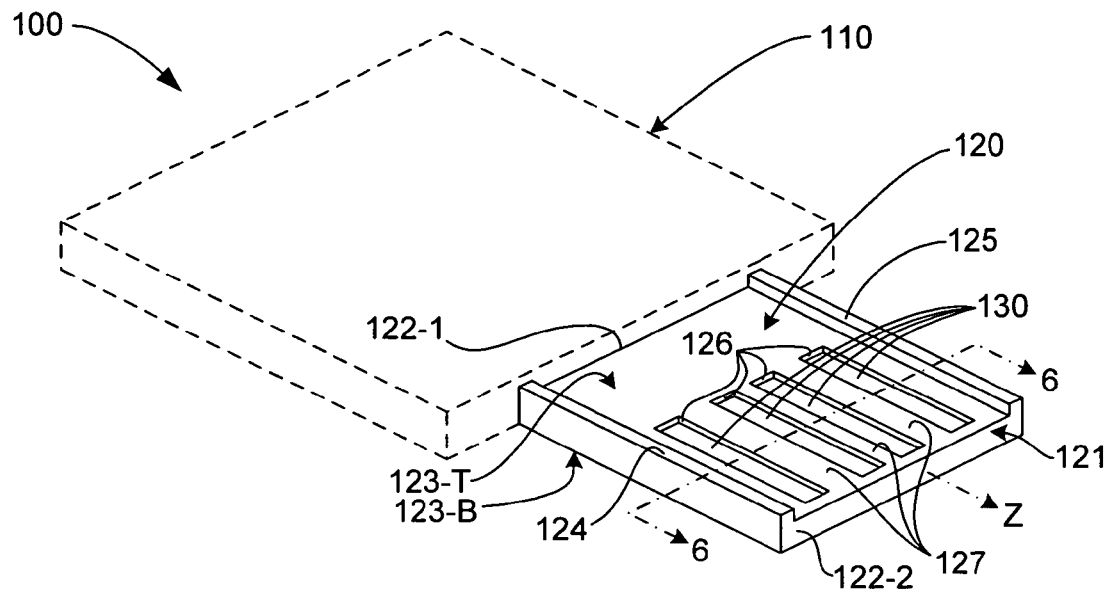
FIGS. 6A and 6B are perspective and cross-sectional end views showing an apparatus including a low-profile male USB connector according to a generalized embodiment of the present invention.
Figure 6B:
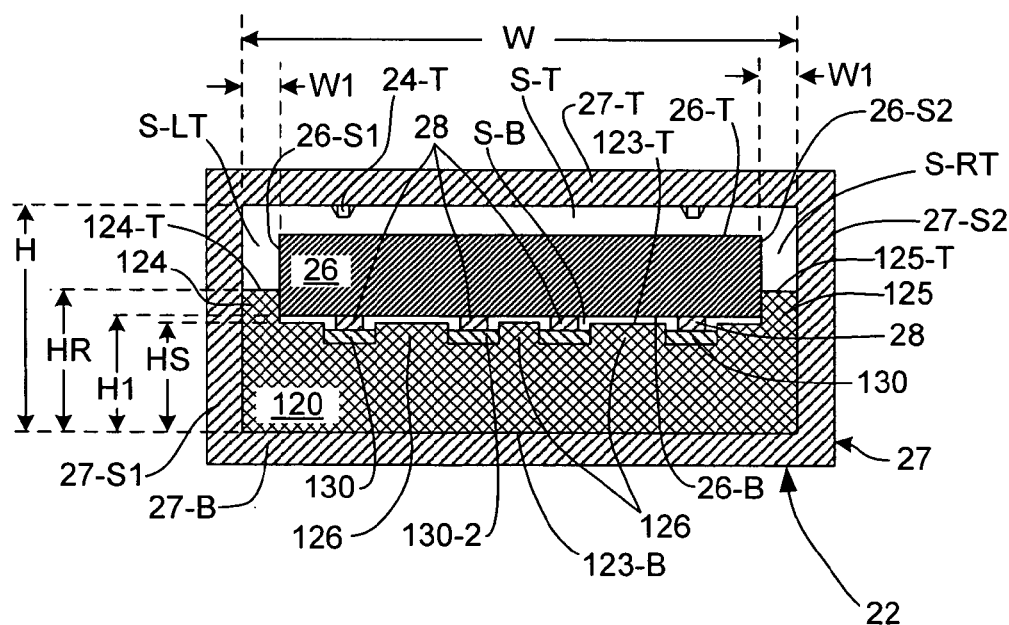

FIGS. 6A and 6B are perspective and cross-sectional side views showing an USB apparatus 100 including a base portion 110 and a male USB connector 120 according to a generalized embodiment of the present invention. As set forth in the specific embodiments described below, base portion 110 is embodied by a housing portion of a USB flash memory card, and houses memory and controller chips. Those skilled in the art will appreciate that USB connector 120 may be mounted onto a wide range of base structures 110, of which a USB flash memory card represents one example.

Referring to FIG. 6A, USB connector 120 includes a relatively planar (flat) base structure 121 having a fixed (first) end 122-1 connected to base portion 110, and a free (second) end 122-2 that is inserted in the direction of arrow Z into a female USB connector (not shown). Base structure 121 includes a substantially planar upper surface 123-T and a substantially planar lower surface 123-B. Upper surface 123-T defines several recessed regions 126 that are located adjacent to free end 122-2 and are respectively separated by elongated ribs 127, with each recessed region 126 and each rib 127 extending parallel to the arrow Z. Located inside and exposed through recessed regions 126 are flat, parallel, elongated metal contacts 130, which engage spring contacts of a female USB connector when male USB connector 120 is inserted therein. In addition, male USB connector 120 includes a first side rail 124 and a second side rail 125 extending along opposite side edges of base structure 121 such that side rails 124 and 125 are aligned parallel to metal contacts 130 (i.e., in the direction of arrow Z).

As indicated in FIG. 6B, base structure 121 and side rails 124 and 125 of male USB connector 120 form a substantially U-shaped cross-section, with base structure 121 occupying lowermost open regions S-B, S-LB, and S-RB of female USB connector 22 when inserted therein, and side rails 124 and 125 extending upward into lower portions of open regions S-LT and S-RT, respectively. Base structure 121 has a thickness HS (i.e., measured perpendicularly between upper surface 123-T and lower surface 123-B) that is less than or equal to the standard height Hi defined between female substrate 26 and lower metal case wall 27-B in order to facilitate insertion of base structure 121 into spaces S-LB, S-B and S-RB. In contrast, each uppermost surfaces 124-T and 125-T of side rails 124 and 125 has a height HR from lower surface 123-B that is greater than standard height H1, thereby causing a portion of each side rail 124 and 125 to extend into open spaces S-LT and S-RT, respectively. Because no portion of male USB connector 120 is located in uppermost open region S-T, the maximum height HR of USB connector 120 is less than the height of conventional male USB connectors (i.e., height H), where the saving in height comes from eliminating the top portion of a conventional male USB connector. That is, the metal case utilized by the conventional male USB connector is removed, and the metal contacts 130 are protected by ribs 126 separating the metal contacts (to be discussed later). In addition, base structure 121 of male USB connector 120 has been expanded to fill the spaces S-LB, S-B and S-RB, as defined in FIG. 5. For the purpose of illustration, metal springs 24-B, which are located inside the bottom wall 27-B (as shown in FIG. 5) are not shown in FIG. 6B as they have been fully deflected in the full-engagement position, whereas metal springs 24-T remain in their undeflected position.

In accordance with another aspect of the present invention, because rails 124 and 125 extend upward into the lower portions of open spaces S-RT and S-LT, male USB connector 120 is restricted from moving or wobbling vertically relative to female USB connector 22 when inserted therein, thereby allowing USB connector 120 to maintain a secure connection to female USB connector 22. That is, rails 124 and 125 are formed such that their uppermost surfaces 124-T and 125-T are at a height HR from bottom surface 123-B (i.e., measured perpendicular to the plane defined by bottom surface 123-B). As such, uppermost surfaces 124-T and 125-T are higher than bottom surface 26-B of female substrate 26 of conventional female USB connector 22, and therefore portions of side rails 124 and 125 are respectively positioned between side edges 26-S1 and 26-S2 of female substrate 26 and side walls 27-S1 and 27-S2 of metal case 27. In addition, each rail has a width that is substantially equal to or slightly less than a width W1 between side surfaces 26-S1 and 26-S2 and side walls 27-S1 and 27-S2, thereby causing the inserted portion of each rail 124 and 125 to be tightly held between 26-S1 and 26-S2 of female substrate 26 and side walls 27-S1 and 27-S2. This tight fitting of rails 124 and 125 provides substantial lateral support for USB connector 120, thereby preventing wobbling and/or unwanted disconnection when USB apparatus 100 (FIG. 6A) is inserted into a female USB connector.

As discussed below with reference to certain specific embodiments, metal contacts 130 can take the form of metal pads built on top of a printed circuit board (PCB) (not shown) and connect to electrical circuits mounted on the PCB through traces, with the PCB placed inside base structure 121 using techniques described below. Alternatively, metal contacts 130 can take the form of metal strips built directly on the top surface of base structure 121, and be connected electrically and physically to the corresponding metal tabs (not shown) as they exit from the rear of USB connector 120. The metal tabs are then soldered to the electrical contacts of a PCB housed in base portion 110. In either case, as described above, male USB connector 120 has an interference fit with inside bottom and lower portions of the two inner side edges of female USB connector 22, thus establishing firm and secure electrical connection between male metal contacts 130 and female metal contact springs 28.

In accordance with yet another aspect of the present invention, ribs 127 serve to prevent undesirable contact with metal contacts 130 when male USB connector 120 is removed from a female USB connector (and otherwise exposed). A benefit of the metal case provided on conventional male USB connectors is that the metal case prevents a user from touching the male contacts, which can deposit grease or other contaminants that reduce electrical conductivity and/or damage the male contacts. By removing the upper portion of the metal case, male USB connector 120 exposes the upper surface of base structure 121. However, by recessing metal contacts 130 a suitable distance below upper surface 123-T of base structure 121, and/or by providing ribs 127 to protect metal contacts 130, unintentional touching of male metal contacts 130 is avoided.

The present invention will now be described in additional detail with reference to several specific embodiments.

FIG. 7A is an exploded view of a low-profile USB flash memory card 700, which consists of $1^{st}$ cover 740, $2^{nd}$ cover 750, and printed circuit board assembly (PCBA) 760.

PCBA 760 consists of a printed circuit board (PCB) 761 having a relatively wide main section 762 and a relatively narrow front portion 765, and electronic components such as flash memory chip 763 and controller 764 mounted to a bottom surface of main section 762. The electronic components can also be mounted to the top surface of main section 762, or to both the top and bottom surfaces for increased storage capacity. Front portion 765 of PCB 732 extends from main section 762, and includes a set of four metal contacts 730 that are formed on the top surface of front section 765 and arranged as described above to contact the corresponding metal contact springs of a female USB connector (not shown) in a full engagement position. Front portion 765 also defines a set of three opening slots 766 such that the front end is divided into four finger-like structures 767, with one metal contact 730 being formed on each finger-like structure 767. Metal contacts 730 are electrically connected to the electronic components (e.g., flash memory chip 763 and controller 764) by way of conductive traces according to known methods.

First cover 740 includes a base section 710 and a low-profile male USB connector 720 extending from base section 710 for engaging with a female USB connector in the manner described above when low-profile USB flash memory card 700 is inserted into the female USB connector. Base section 710 includes a box-like frame defining a central cavity 715 for receiving main section 762 of PCB 761. USB connector 720 is integrally formed (e.g., molded as a single piece) with first cover 740, and includes a base structure 721 defining one or more slot-like pockets (described further below) that communicate with central cavity 715 for receiving front portion 765 of PCB 760 in the manner described below.

Second cover 750 is a plate-like structure that mounts over central opening 715 to protect PCBA 760 after assembled therein. In one embodiment, first cover 740 and second cover 750 are formed (e.g., molded) from a rigid plastic material and connected by ultrasonic welding or a suitable adhesive.

FIG. 7B is a cross-sectional side view showing a portion USB connector 720 inserted into a conventional female USB connector 22, and FIG. 7C is an enlarged cross-sectional view showing a portion of the structure shown in FIG. 7B. The four openings 726 are formed on the top surface 723-T of the male slim USB connector 720 allowing the metal contacts 730 to be exposed through these openings. In particular, a T-shaped rib 727 is formed between each adjacent pair of openings 726, and a pocket portion (slot) 728 is formed below each opening for receiving a corresponding finger 767 of the inserted PCB front portion. As the PCB is inserted into the pocket of male USB connector 720, each adjacent set of fingers 767 and their associated metal contacts 730 are separated by corresponding ribs 727, and each finger is inserted into a corresponding pocket portion 728. Each rib 727 a T-shaped profile with the height of the vertical portion of each "T" slightly larger than the thickness of the inserted PCB finger 767. This configuration allows each finger 767 of PCB 760 to be securely held in place on its two edges by neighboring ribs 727, and on its front edge by the inside surface of a front wall 729 (shown in FIG. 7A) of USB connector 720. In addition, the height of each T-shaped rib 727 (i.e., the distance between 723-T and the bottom of finger 767) is smaller than the combined heights of each finger 767, associated metal contact 730 and female spring contact 28 to ensure a good physical and electrical contact between the female spring contacts 28 and male metal contacts 730 when male USB connector 720 is inserted into female USB connector 22. Finally, end-rails 724 and 725 (shown in FIGS. 7A and 7B) extend above upper surface 723-T in the manner described above to occupy the gap between the sidewalls of metal case 27 and the vertical sidewalls of the female substrate 26 of female USB connector 22.

Figure 8A:
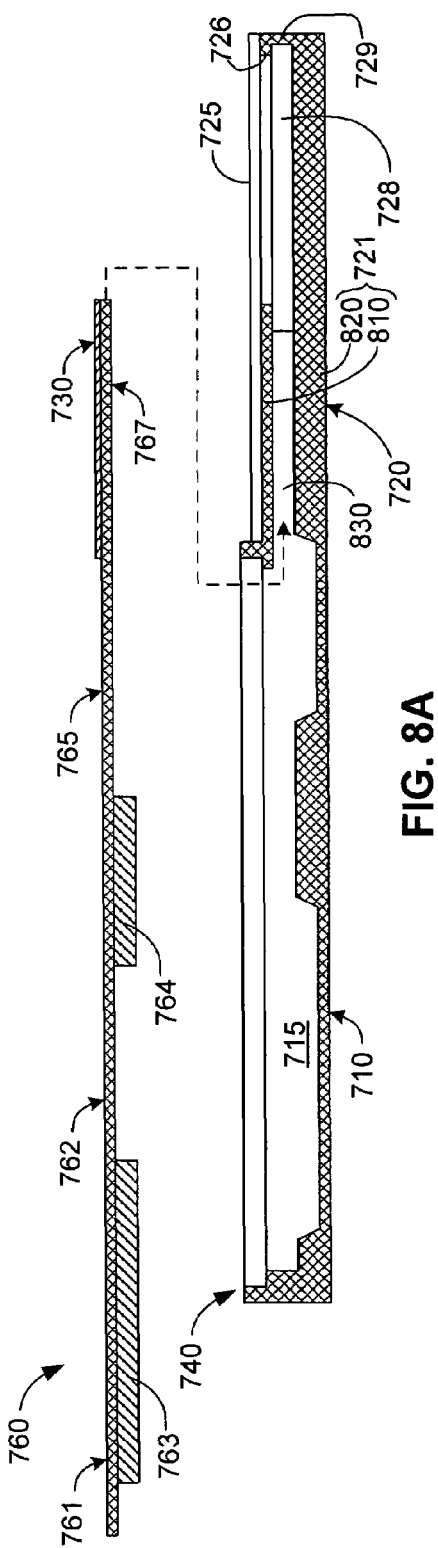
FIGS. 8A, 8B, and 8C are cross-sectional side views showing the USB flash memory card of FIG. 7A during assembly.
Figure 8B:
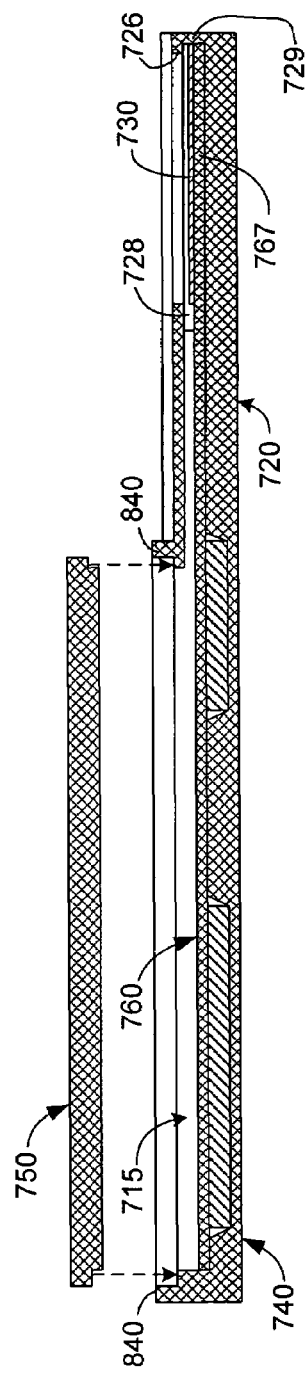
Figure 8C:
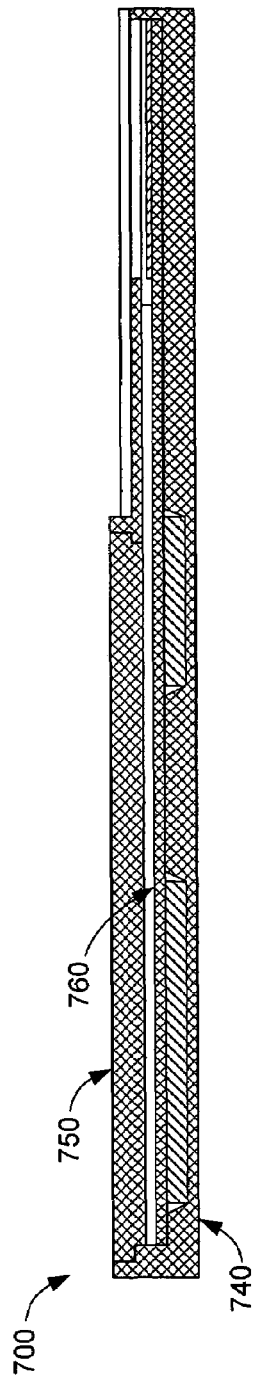

FIGS. 8A to 8C are cross-sectional side views showing a method for assembling low-profile USB flash memory card 700 according to another embodiment of the present invention. Referring to FIG. 8A, as described above, PCBA 760 includes a PCB 761 having main section 762 with flash memory chip 763 and controller 764, and front portion 765 including multiple fingers 767 (one shown) having metal contacts 730 mounted thereon. As also described above, first cover 740 includes base section 710 and low-profile male USB connector 720 extending therefrom. As indicated in FIG. 8A, base section 710 includes central chamber 715 including contoured depressions for receiving integrated circuits (e.g, flash memory chip 763 and controller 764, as shown in FIG. 8B). In addition, base structure 721 of USB connector 720 includes an upper wall 810 and a lower wall 820 defining a horizontal pocket (slot) 830 therebetween that communicates with central chamber 715 of base section 710. Pocket portions 728 extend from pocket 830 toward front wall 729. During assembly, the front edge of PCBA 760 (i.e., fingers 767) are inserted through central chamber 715 into pocket 830 (indicated by dashed arrow in FIG. 8A), and slid forward until each finger 767 is received in its associated pocket portion 728. Each pocket portion 728 extends beyond the front edges of its corresponding opening 726, as illustrated at the right side of FIG. 8B. This extra undercut length allows the front edge of each finger portion 767 and its associated metal contact 730 to be protected by front wall 729 and upper wall 810 of male USB connector 720 when the slim USB flash memory card is fully inserted to the female USB connector. The undercut pocket arrangement also provides additional alignment between the PCBA 760 and connector 720. As indicated in FIGS. 8B and 8C, after PCBA 760 is fully inserted into first housing 740, second housing 750 is secured onto a support section 840 provided on base section 710 around central chamber 715 by ultrasonic welding or suitable adhesive.

FIGS. 9A to 9C are cross-sectional side views illustrating the insertion of male USB flash memory card 700 into a standard female USB connector 22. As shown, male low-profile USB connector 720 occupies essentially the lower portion of the female connector 22, which a portion of the side rails (e.g., side rail 725) extending above the lower edge 26-B of female substrate 26. As indicated in FIG. 9B, when front wall 729 of USB connector 720 reaches spring contact 28 of female USB connector 22, spring contact 28 is deflected or flattened upward by front wall 729, and then resiliently extends through openings 726 to contact metal contacts 730, as shown in FIG. 9C. Because the front edge of each PCB finger 767 is not rubbed against an associated spring contact 28 when flash memory card 700 is being inserted into female connector 22, a longer life can be expected. Note again that although the first cover 740 and second cover 750 appear to be bottom and top covers of the flash memory card 700, respectively, in the figures, they can be reversed.

Note also that although low-profile USB connector 720 uses four metal contacts 730 on the PCB 760, and four openings (slots) 726 formed in low-profile male USB connector 720, the number and location of metal contacts and openings/slots can be changed should new data transmission protocol be proposed. The concept for the embodiment shown in this disclosure can be applied without loss of generality FIGS. 10A, 10B, and 10C are exploded perspective, cross-sectional end, and enlarged cross-sectional end views of a low profile USB flash memory card 1000 according to another specific embodiment of the present invention. USB flash memory card 1000 consists of an upper cover 1040, a lower cover 1050, and PCBA 760. The external shape of assembled USB flash memory card 1000 and of PCBA 760 are substantially the same as described above with reference to the specific embodiment shown in FIG. 7A. However, USB flash memory card 1000 differs from the above-described embodiment in that the construction of upper cover 1040 and lower cover 1050 is different. In particular, both upper cover 1040 and the lower cover 1050 include portions of male USB connector 1020 (indicated in FIG. 10B) which extend to the front edge of the card 1000, and the PCBA 760 is sandwiched between upper cover 1040 and lower cover 1050. In particular, referring to the upper portion of FIG. 10A, upper cover 1040 includes a base section 1010 and a male USB connector portion 1020A. Upper portion 1020A of male USB connector 1020, which is part of upper cover 1040, includes an upper (first) base structure portion (upper wall) 1021A defining four substantially rectangular openings 1026 that are separated by upper rib portions 1027A. Upper base structure portion 1021A also includes side rails 1024 and 1025 that are located at opposite side edges of base structure portion 1021A, and extend above an upper surface of base structure portion 1021A in the manner described above. Lower cover 1050 includes a main section 1055 and a lower (second) base structure portion 1021B that includes several lower rib portions 1027B that are separated by grooves 1028. Each lower rib portion 1027B extends between adjacent openings 1026, and forms a T-shaped structure with a corresponding upper rib portion 1027A as shown in FIG. 8B. After mounting PCBA 760 onto lower cover 1050 such that fingers 767 enter into grooves 1028 and lower rib portions 1027B are received in slots 766, upper cover 1040 is mounted onto lower cover 1050 such that the bottom surface of the upper rib portions 1027A are mounted onto the top surface of lower rib portions 1027B, thereby forming pockets that securely hold fingers 767 in a manner similar to that described above. Note that recessed cavities (not shown) may be created around the perimeter of main section 1055 and lower base structure portion 1021B of lower cover 1050 to prevent excessive material from overflowing to the PCB and metal contact areas if an ultrasonic method is used to join the upper cover 1040 and lower cover 1050.

Figure 11A:
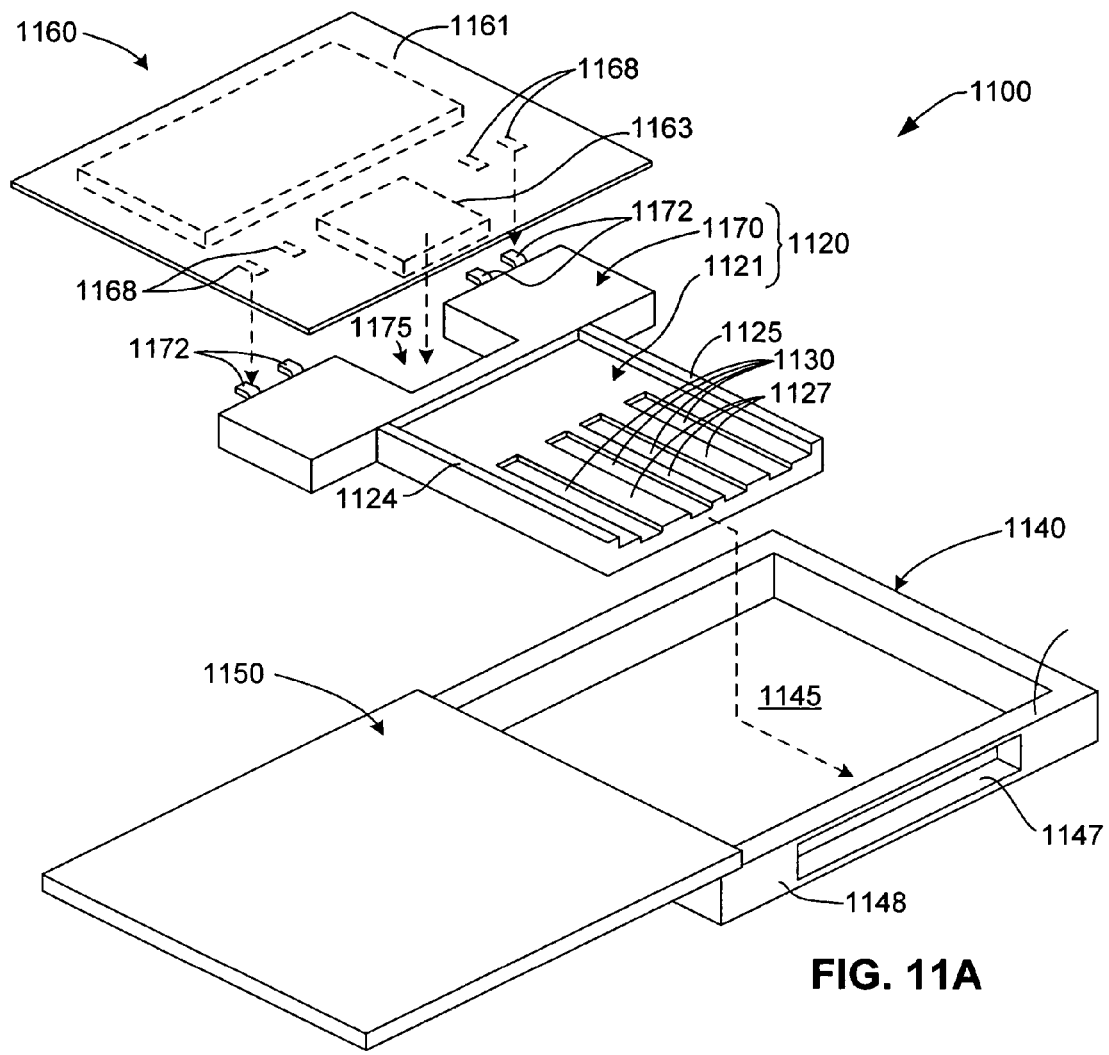
FIGS. 11A and 11B are exploded perspective and cross-sectional end views showing a USB flash memory card including a low-profile male USB connector according to a third specific embodiment of the present invention.
Figure 11B:
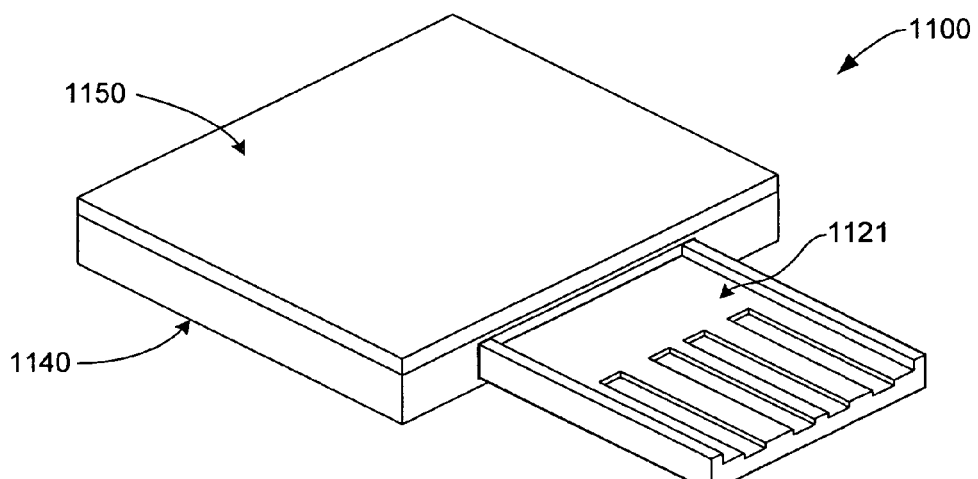

FIGS. 11A and 11B are exploded perspective and assembled perspective views, respectively, showing yet another embodiment of a low-profile USB flash memory card 1100, which consists of lower cover 1140, upper cover 1150, PCBA 1160 and low-profile male USB connector 1120. USB connector 1120 includes a plastic or ceramic base structure 1121 and a connection base 1170 that includes metal tabs 1172 and defines a notch 1175. Metal contacts 1130 have the form of metal strips built directly on the top surface of base structure 1121, and are connected electrically and physically to the corresponding metal tabs 1172 as they exit from the rear of base structure 1121. During assembly, connection base 1170 is secured to PCBA 1160 such that controller 1163 is received in notch 1175, and metal tabs 1172 are then soldered to the electrical contacts 1168 of PCB 1161. A rib-like structure 1127 is formed between each adjacent pair of metal contacts 1130, as illustrated in FIG. 11A. Ribs 1127 separate the metal contacts 1130 in the transverse direction, and are taller than the top of metal contacts 1130, thus providing protection against accidental touch by human fingers. The height of each rib 1127 is smaller than the combined heights of the metal contact 1130 and the female metal contact spring of a conventional female USB connector (described above) to ensure a good contact between the two when the USB flash memory card 1110 is inserted to the female USB connector. A pair of raised end-rails 1124 and 1125 are shown which will occupy the space between the inside metal case of the female USB connector and the vertical sidewalls of the substrate of the female USB connector in the manner described above. The topside of the end-rail 1124 and 1125 is at least taller than the bottom edge of the substrate of the USB female connector to ensure a secure fit and reduce wobbling. After assembling USB connector 1120 and PCBA 1160, the assembled unit is inserted into a central chamber 1145 of lower cover 1140 such that base structure 1121 extends through an opening 1147 formed in a front wall 1148 of lower cover 1140. Upper cover 1150 is then slid or otherwise positioned over central chamber 1145 and secured using ultrasonic welding or suitable adhesive.

Alternative manufacturing and assembly methods that may be used for manufacturing at least some of the low-profile USB flash memory cards disclosed herein will now be described. In one embodiment, the lower cover is fabricated by injecting molten plastic into a mold. The electronic components separately are mounted to the PCB to form a PCBA, and the PCBA is aligned and assembled with the plastic lower cover. The sub-assembly consisting of the lower cover and the PCBA is then placed in a secondary mold, and a secondary molding process is performed to form a structure similar to the upper cover described above. After the molten plastics fill the mold the final completed flash memory card is removed from the mold and the 2-step molding process is complete. As illustrated, the end of molding process also concludes the assembly process, thus savings in assembly time and resources can be achieved. In addition, the electronic components and PCB have been securely sealed in the plastic covers thus providing a ruggedized card assembly which may provide better protection against shock and vibration to the USB flash memory card. The process involves more than one plastic molding step, and is thus called a multiple-step molding. A single molding step process can be used as an alternative to the multiple-step molding process described above. In the single molding step process, the electronic components are mounted to a PCB to form a PCBA. The PCBA is then positioned inside the mold cavity. The inside surfaces of the mold cavity correspond to the external surfaces of the USB flash memory card assembly. Molten plastic then fills the mold cavity, thereby encasing the PCBA in molded material, but leaving the male connector uncovered. Finally, the completed flash memory card is removed from the mold and the single-step molding process is complete.

Alternatively, a more conventional method can be used to manufacture and assembly the USB flash memory card. The conventional molding process includes fabricating the lower cover by injecting molten plastic into a first mold. The electronic components are mounted to a PCB to form a PCBA, and the PCBA is aligned and assembled with the plastic lower cover. An upper cover is molded separately (i.e., using a second mold). The sub-assembly consisting of the lower cover and the PCBA is then placed in an assembly mold. Finally, an ultrasonic joining method is used in to join together the upper cover and the sub-assembly.

Other applications besides flash drives include USB connectors on desktop computers, notebook computers, PDA's, digital cameras, cellular phones or handsets, TV set-top boxes, MP3, MPEG4, copiers, printers, and other electronic devices. Such devices may use to advantage the slim-ness of the new male and/or female USB connectors, and may reduce size and space together with lower cost. A USB flash drive with the new slim male connector can still be directly inserted into a host PC with a legacy USB female connector.

There are four pins in the current USB pin out definition—VCC, GND, D+, and D−. VCC is the 5V power pin. GND is the ground pin and D+ and D− are the differential data I/O pins. For the USB 2.0 specification, data transfer rates are up to 480M bits/sec, and the power supply current is 500 mA. These might not meet future (or even some current) needs of speed and power associated with some USB devices, such as large flash memory cards.

Additional metal contacts can be added to the new connectors. These additional metal contacts can serve as power, ground, and/or I/O pins which are extensions to the USB specification, or as PCI Express (or mini PCI Express) specifications. Greater power capability can be obtained with (or without) additional power and ground pins (or by a higher power supply current of the existing power pin). Multiple power supplies can also be provided by the additional power and ground pins. The improved power supply capabilities allow more devices and/or more memory chips to be powered. Extra I/O pins can be added for higher bandwidth and data transfer speeds. The additional I/O pins can be used for multiple-bit data I/O communications, such as 2, 4, 8, 12, 16, 32, 64, . . . bits. By adopting some or all of these new features, performance of flash memory cards/devices can be significantly improved. These additional pins could be located behind or adjacent to the existing USB pins, or in various other arrangements. The additional pins could be applied to male and female connectors, both the current or the new slim connectors. New types of flash memory cards/devices can be made with these new connectors, which have the additional pins.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A low-profile male Universal-Serial-Bus (USB) connector comprising:
   a base structure having opposing upper and lower surfaces, and opposing first and second side edges;
   a plurality of elongated, parallel metal contacts that are recessed into the base structure such that the parallel metal contacts are located between the upper and lower surfaces; and
   at least one side rail positioned along at least one of said first and second side edges and extending from the upper surface away from the base structure,
   wherein the base structure includes an upper wall defining a plurality of openings, a lower wall, and a pocket defined between the upper and lower walls,
   wherein the male USB connector further comprises a printed circuit board (PCB) having a portion inserted into the pocket, and
   wherein the metal contacts are formed on the portion of the PCB such that each metal contact is exposed through an associated opening of the plurality of openings.

2. The low-profile male USB connector according to claim 1, further comprising a connection base integrally formed with the base structure, the connection base including a plurality of tabs, each tab being electrically and physically connected to an associated one of the metal contacts.

3. The low-profile male USB connector according to claim 1,
   wherein the upper and lower walls of the base structure comprise an integrally molded structure connected by an end wall,
   wherein the pocket includes a plurality of separated, parallel pocket portions, and
   wherein the portion of the PCB includes a plurality of parallel fingers, each finger being received in an associated one of the pocket portions.

4. The low-profile male USB connector according to claim 3,
   wherein the base structure includes T-shaped ribs extending between the upper and lower walls between each adjacent pair of said pocket portions, and
   wherein a vertical portion of each T-shaped rib has a height that is slightly larger than a thickness of the plurality of parallel fingers.

5. The low-profile male USB connector according to claim 1, further comprising:
   an upper cover including a first connector portion comprising the upper wall; and
   a lower cover including a second connector portion comprising the lower wall,
   wherein the upper and lower covers are connected such that the upper and lower walls are separated by the pocket.

6. The low-profile male USB connector according to claim 5,
   wherein the second connector portion includes a plurality of ribs extending from the lower wall and abutting a lower surface of the upper wall, thereby separating the pocket into a plurality of pocket portions, and
   wherein the portion of the PCB includes a plurality of parallel fingers, each finger being received in an associated one of the pocket portions.

7. A low-profile male Universal-Serial-Bus (USB) connector for mounting onto a standard female USB connector, the standard female USB connector including a metal case, a female USB connector substrate disposed inside the metal frame, and a plurality of spring contacts mounted on a surface of the female USB connector substrate, wherein the female USB connector defines a first open region located between the spring contacts an a bottom wall of the metal case, a second open region located between a first side edge of the female USB connector substrate and a first side wall of the metal case, and a third open region located between a second side edge of the female USB connector substrate and a second side wall of the metal case, wherein the male USB connector comprises:
   a base structure having opposing upper and lower surfaces and opposing first and second side edges that are sized to be received within the first open region of the female USB connector;
   a plurality of elongated, parallel metal contacts that are recessed into the base structure such that the parallel metal contacts are located between the upper and lower surfaces, and positioned to abut the spring contacts of the female USB connector when the base structure is fully inserted into the first open region of the female USB connector; and
   at least one side rail positioned along at least one of said first and second side edges and extending from the upper surface such that said at least one side rail extends into at least one of the second open region and the third open region when the base structure is inserted into the first open region of the female USB connector,
   wherein the base structure includes an upper wall defining a plurality of openings, a lower wall, and a pocket defined between the upper and lower walls,
   wherein the low-profile male USB connector further comprises a printed circuit board (PCB) having a front portion inserted into the pocket, and
   wherein the metal contacts are formed on the front portion of the PCB such that each metal contact is exposed through an associated opening of the plurality of openings.

8. The low-profile male USB connector according to claim 7, further comprising a connection base integrally formed with the base structure, the connection base including a plurality of tabs, each tab being electrically and physically connected to an associated one of the metal contacts.

9. The low-profile male USB connector according to claim 7,
wherein the upper and lower walls of the base structure comprise an integrally molded structure connected by an end wall,
wherein the pocket includes a plurality of separated, parallel pocket portions, and
wherein the front portion of the PCB includes a plurality of parallel fingers, each finger being received in an associated one of the pocket portions.

10. The low-profile male USB connector according to claim 9,
wherein the base structure includes T-shaped ribs extending between the upper and lower walls between each adjacent pair of said pocket portions, and
wherein a vertical portion of each T-shaped rib has a height that is slightly larger than a thickness of the plurality of parallel fingers.

11. The low-profile male USB connector according to claim 7, further comprising:
an upper cover including a first connector portion comprising the upper wall; and
a lower cover including a second connector portion comprising the lower wall,
wherein the upper and lower covers are connected such that the upper and lower walls are separated by the pocket.

12. The low-profile male USB connector according to claim 11,
wherein the second connector portion includes a plurality of ribs extending from the lower wall and abutting a lower surface of the upper wall, thereby separating the pocket into a plurality of pocket portions, and
wherein the front portion of the PCB includes a plurality of parallel fingers, each finger being received in an associated one of the pocket portions.

13. A Universal-Serial-Bus (USB) flash memory device comprising:
a printed circuit board assembly (PCBA) including a printed circuit board (PCB) having a first section and a second section, the PCBA also including a plurality of electronic components mounted on the first section, and a plurality of metal contacts formed on the second section and electrically connected to the electronic components; and
at least one cover including a main section defining a central chamber for receiving the first section of the PCBA, and a male connector including a base structure having an upper wall mounted over the second section of the PCBA,
wherein the upper wall of the base structure defines a plurality of openings positioned such that each metal contact is exposed through a corresponding opening of said plurality of openings, and
wherein the base structure includes at least one side rail positioned along at least one of said first and second side edges, and formed such that the at least one side rail extends from the upper wall away from the base structure.

\* \* \* \* \*